May 6, 1958  B. SPIES ET AL  2,833,037
ARTIFICIAL TOOTH MOUNTING
Filed June 25, 1956  2 Sheets-Sheet 1
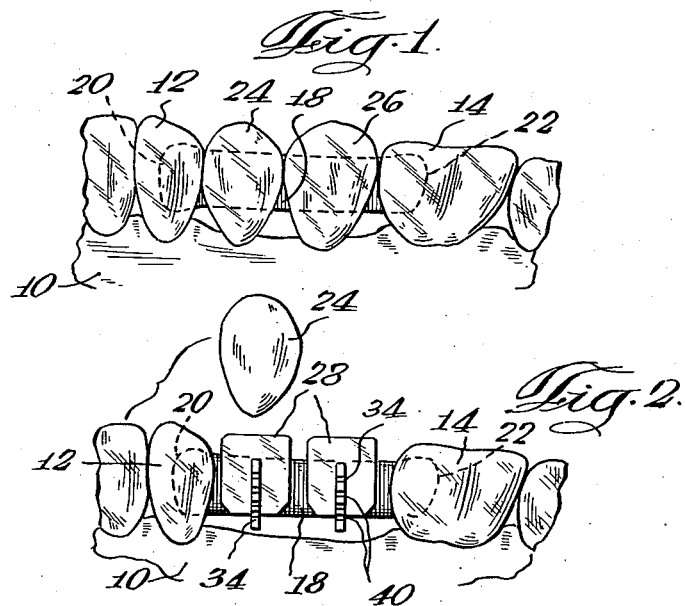
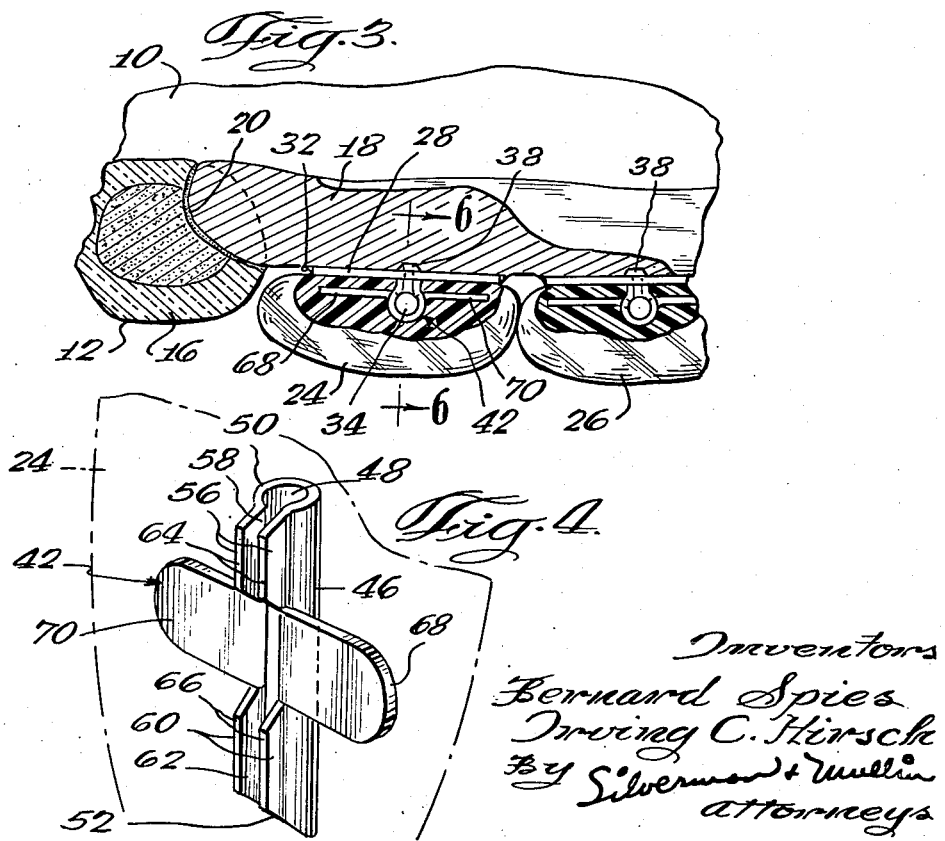
Inventors
Bernard Spies
Irving C. Hirsch
By Silverman & Mullin
Attorneys

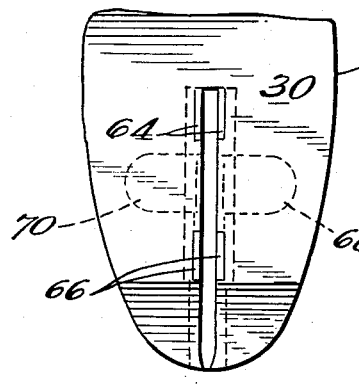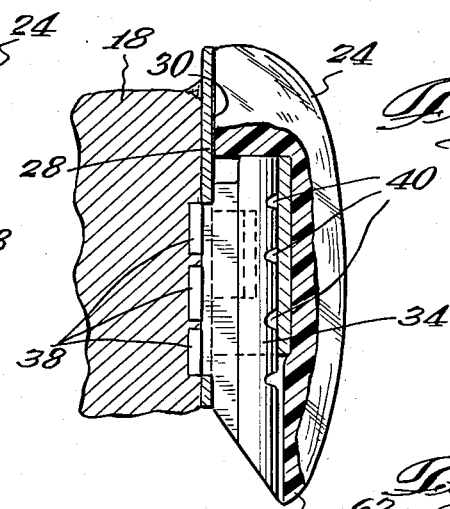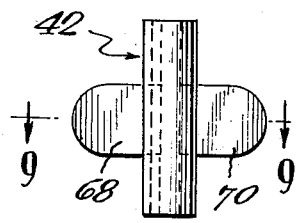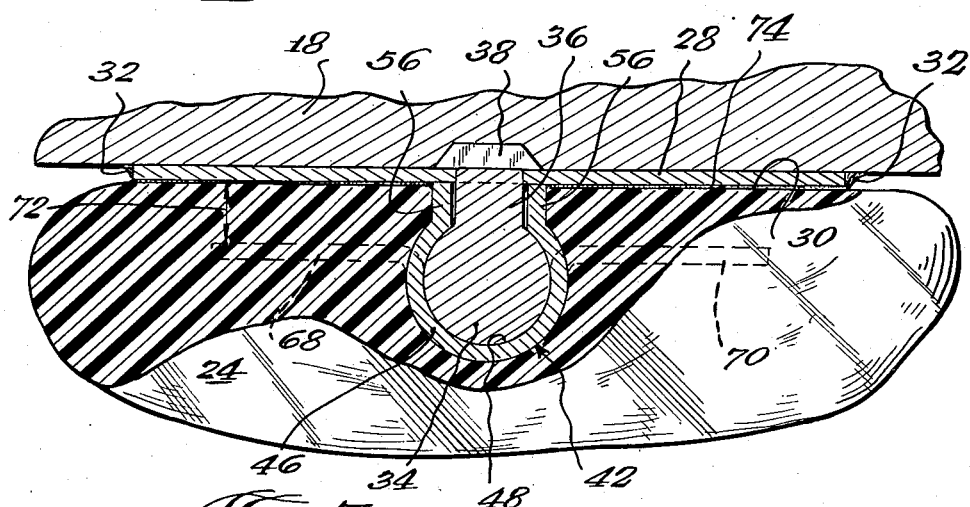

2,833,037

ARTIFICIAL TOOTH MOUNTING

Bernard Spies and Irving C. Hirsch, Skokie, Ill.

Application June 25, 1956, Serial No. 593,688

10 Claims. (Cl. 32—10)

This invention relates generally to artificial teeth and more particularly is concerned with a mounting for such artificial teeth.

It is generally known that artificial teeth facings can be more easily and economically fabricated with natural appearance and texture of resinous plastics than other materials known and used. For example, the acrylics have been used for this purpose, and especially the methacrylate resins. The use of plastic resins for artificial teeth facings has, however, not been widespread. As a matter of fact, such use has declined, if anything. When one considers the difficulty of matching compounding and securing artificial teeth facings of porcelain, and contrasts the same with the ease and economy of matching and producing the plastic facings, the importance of the structure which will be described hereinafter and comprising the invention will be appreciated the more readily.

The disadvantages of resinous plastic teeth facings have arisen because of the complete absence, until the advent of this invention, of a strong, simple, economical and durable structure for mounting the facing to be secured by a backing. The general structure of using a dowel and slot has been known, but in the case of resinous plastic teeth, the facings have had a tendency to split and crack because of stresses inherent in the manner of mounting. Grooves for known types of dowels are a most common type of construction, with the groove molded into the rear of the facing, and the facing being slipped over the dowel and cemented in place. The usual breakage occurs at the reduced thickness of the tooth required because of the presence of the groove. Furthermore, twisting stresses caused during the use of the tooth gives rise to cracks, corner breaks, and similar damage.

The prying effect of biting into an object or material which engages between the rear of the tooth and the backing (since the cementitious material with which the facing is applied eventually will wash out in the salivary fluids) is devastating to the type of structure heretofore used. The tooth facing will invariably break away from the backing because of crumbling of the groove edges.

The invention contemplates as its principal object the alleviation of the difficulties which have beset the structures thus far used in applying plastic resinous teeth facings to backings, and the elimination of the disadvantages inherent therein.

The problems which have been overcome by the invention herein include the problem of providing a mounting for a resinous plastic artificial tooth facing which takes into consideration the deformability and the problem caused by the loss of retentivity of the cementing bond between the plastic facing and a base or backing to which the same is secured. Because of the deformability, normally advantageous, unusual strains may occur to invite cracks and failure. Because of the flexibility, it is difficult to retain a good bond since the application of separating forces is not spread over the entire cemented area as in the case of rigid porcelain facings, but may be applied at corners and edges, for example, causing a gradual working loose of the entire bond.

An important object of the invention lies in the provision of a novel dental facing which comprises a facing member having an anchoring device embedded therein which is of a construction to absorb strains, while strengthening and supporting the tooth facing and enabling the same to be easily and permanently secured to a backing of simplified, known construction in an association capable of long periods of hard use.

The provision of the anchoring device and its particular construction, in and of itself, is also an important object of the invention in addition to the provision of the facing with the device secured therein.

Other objects of the invention are of importance. These include the provision of an anchoring device for enabling the facile and effective application of an artificial tooth facing to a backing, the anchoring device being formed of sheet metal by stamping and hence being very economical and strong; the provision of an anchoring device which can be sold as a unit to dental technicians and applied to any size or shape of tooth facing, thereby making the advantages of strength and durability available to a wide strata of users; the provision of an anchoring device which may be embedded in an artificial tooth facing with no great requirements of skill and technique and with a minimum of time; the provision of a tooth facing having an anchoring device embedded therein which is formed with a cylindrical member capable of twisting along its length, and having two parts spaced from one another along the length whereby strain is not transmitted from one part to the other; the provision of an anchoring device which is provided with lateral wings integrally formed with the anchoring device and which are located between the spaced parts and directed toward and supporting the incisal edges of the facing; the provision of a facing having the supporting and strengthening anchoring means therein but which has the anchoring means located beneath the engaged surface of the facing whereby substantially the entire anchoring device is embedded in the facing; the provision of a facing as described, but also having a portion of the anchoring device comprising flange edges or tracks engaged against the backing to support and position the same and aid in securing the same thereto by cement or otherwise.

An important object of the invention lies in the provision of an artificial tooth facing having embedded therein an anchoring device as described which includes a bore or key-way for the reception therein of a dowel secured to the backing, and in which the diameter of the bore is slightly less than the diameter of the dowel, and further in which the cylindrical member providing the bore or key-way is capable of being sprung so that the insertion of the dowel spreads the cylindrical member to cause a resilient engagement between the dowel and the key-way.

The above enumerated objects are not exclusive since those skilled in this art will appreciate and understand that many other objects are intended and advantages achieved from the invention as the description which follows proceeds. The invention will be seen to reside in certain structures and combinations of structures for accomplishing these objects and in order to aid in a complete understanding thereof and to demonstrate the advance in the arts and sciences achieved, there is described in detail and illustrated in the drawings a preferred embodiment of the invention from an examination of which the manner of practice and use thereof will be fully comprehended.

Variations in size and proportion and in certain details are capable of being made without in any way departing from the invention. For example, different kinds and sizes of dental facings will require variations which are capable of being made by one who understands and uses the invention.

The same reference characters are used in the figures to designate the same parts in modified forms.

In the drawings:

Fig. 1 is a front elevational view of a denture or group of teeth having several facings included therewith which are constructed in accordance with the principles and teachings of the invention.

Fig. 2 is a similar view, but showing the facings removed from the backings.

Fig. 3 is a sectional view through the denture or group of teeth of Fig. 1 showing the internal structure thereof.

Fig. 4 is a perspective view of the anchoring device of the tooth facing of the invention, showing the general position thereof associated with an artificial tooth facing, and also showing a slight modification.

Fig. 5 is a rear elevational view of a tooth facing having the anchoring device embedded therein, the same being constructed in accordance with the invention and shown disassociated from the backing.

Fig. 6 is a sectional view taken through one of the artificial teeth of Fig. 3 along the line 6—6 and in the direction indicated.

Fig. 7 is a fragmentary sectional view similar to that of Fig. 3 but of only one of the artificial teeth and on a greatly enlarged scale so that the details of the structure may more readily be appreciated.

Fig. 8 is a top plan view of the anchoring device of the invention, the device being disposed as though associated with a facing, and the view being from the front of the facing. This is the rear of the disposition of the anchoring device in Fig. 5.

Fig. 9 is a median sectional view through the anchoring device generally along the line 9—9 of Fig. 8 and in the direction indicated.

The invention generally contemplates the embedment of a metal stamping in a resinous plastic artificial tooth facing, the stamping being an anchoring device having a cylindrical or barrel portion arranged generally along the axis of the tooth and provided with lateral wings directed toward the edges of the tooth. The anchoring device is split along its length so that the subjecting of the same to twisting will have little or no effect upon the tooth but the strain will be taken up by the anchoring device and hence not be transmitted as splitting or breaking stresses to the facing. The wings or lateral extensions are embedded in the tooth over a wide area and hence support and strengthen the facing in a manner not contemplated in this art prior to this time. Although the entire anchoring device is practically embedded there is provided a cylindrical bore or channel or key-way for the reception of the dowel of a backing so that the tooth facing may be secured to said backing. The anchoring device also has flanged edges which are exposed and in the plane of the rear of the facing which is engaged to the backing and hence which aid in accurately and strongly securing the facing to the backing.

Preferably the cylindrical bore or key-way is constructed to provide resilient and tight engagement with the dowel so that the facing will not readily slip from the backing.

The details of the invention will be described now, but prior to entering upon such discussion, another great advantage will become apparent and should at this point be mentioned. Where the cementitious bond between the facing and the backing "washes out" over a period of years, or it is desired to replace the facing of the invention, it is an extremely simple matter to do so, and in so doing the facing need not be broken into parts or damaged. This is because there is no attrition of the body of the facing since all incidental wear, even of a minute nature caused by normal masticatory process, is prevented because of the anchoring device.

In Figs. 1, 2 and 3 there are illustrated a group of teeth of any type, such as for example natural or prosthetic, adapted to have facings attached thereto. A portion of the lower jaw and gums of a patient are designated generally 10 and there are shown two abutment teeth 12 and 14 which have metallic anchoring crowns secured thereto. This is diagrammatically indicated at 16 in the sectional view through the tooth 12 as shown in Fig. 3. A base or bridging member 18 is set into sockets or seats formed in the abutment teeth 12 and 14, or in any other way securely attached as for example by soldering at 20 and 22. The two teeth which are to be provided as artificial facings comprise the teeth 24 and 26. The facings 24 and 26 being identical in construction, although not usually in configuration, only the facing 24 and its manner of securement to the backing need be described.

The backing or backing plate as it is known consists of a metal member 28 of generally rectangular configuration to provide a large engaging area for the posterior surface 30 (Fig. 5) of the facing tooth 24. The backing plate 28 is soldered to the base member 18 as at 32 and it will be seen that the same is provided with a vertically arranged elongate dowel or key 34 which is permanently engaged in the face thereof and spaced therefrom by means of an elongate neck 36 of substantially lesser diameter than the dowel or key 34. The particular backing plate 28 is known and its particular constructure per se has been used in the art. Although various manners of securing the dowel 34 and its neck 36 to the plate 28 are known, the particular structure illustrated has integral rearwardly extending lugs 38 which engage through suitable openings in the backing plate 28 and are swaged or brazed in place. Along its length, the dowel 34 is serrated or scored as shown at 40 to provide better gripping of the facing, which is more necessary where conventional facings are used with the backing plate 28.

Inviting attention to the facing 24, there is provided an anchoring device 42 which is embedded therein. The facing 24 is formed of a molded material, especially for example resinous plastic, and in the process of molding the same, the anchoring device 42 is positioned in a manner to be described so that the same forms a reenforcing core or center for the facing 24, giving rise to the advantages of the invention.

As previously mentioned, the anchoring device 42 is formed of sheet metal, by punching or otherwise working the same in suitable dies, and achieves a great deal of strength and resilience because of this manner of formation. Unlike prior devices of the type which have been used in special dentures wherein, for example, there have been dovetailed connections which have been individually cast, the anchoring device is very economical and can be made in large quantities using modern mass production methods without in any way decreasing its efficiency and strength. Furthermore, no prior device has been constructed in the same way as the device of the invention.

There is provided an elongate cylindrical barrel 46 having a central bore or key-way 48 along its length. The ends of the barrel may be of any suitable arrangement, that is to say they may be provided with squared end faces as at 50 or slanted faces 52 as shown in the slightly modified form of Fig. 4, the slanted face 52 perhaps being disposed at the root end of the facing 24, the bottom 54, and being open along the slanted plane of the facing 24 to admit the insertion of the dowel 34 thereat. The opposite end is closed off by the body of the facing 24. The structure of Fig. 4 is in all other respects identical to the anchoring device 42 of other figures.

In any event, the barrel 46 is split along its length so that the cylindrical key-way or bore 48 is not completely enclosed. A pair of parallel ears or flanges 56 are integral with the barrel 46 extending laterally thereof adjacent the end 50 giving rise to a slot 58 whose purpose will be described. A second pair of ears 60 forming slot 62 are provided at the opposite end of the barrel 46, the pairs of ears being spaced apart along the length of the anchoring device 42. The flanges 56 and 60 extend laterally of the barrel a distance sufficient to provide a snug fit in the barrel for the dowel 34 with the neck 36 accommodated in the slots 58 and 62. It will be seen that the dowel 34 and its neck 36 actually comprise a projection formed on the backing plate 28 which has a keyhole-shaped cross section which is uniform along its length vertically. The bore 48 and the formed slots 58 and 62 which accommodate this projection are correspondingly and conformingly keyhole-shaped in cross section. It will be appreciated that this is true only at the positions of the flanges.

The flanges 56 and 60 are aligned lengthwise of the barrel to provide for the snug fit hereinabove described, and because of the manner of assembly—the sliding of the dowel into the bore or key-way 48—the facing edges of the flanges which are designated 64 and 66 bear against and seat upon the face of the backing plate 28. This assists in the attachment of the facing 24 to the backing plate 28 and the prevention of pressure being applied to the facing directly. In other words, it provides a metallic means for transmission of the principal bearing stress to the anchoring device 46. Because of this, the bore 48 may be made slightly smaller than the diameter of the dowel 34 so that the completed facing is required to be forced into engagement with the dowel which spreads due to the inherent resilience of the metal and the deformability of the resinous plastic. This provides a resilient locking engagement for the facing on the backing plate.

It may be pointed out that the construction of the anchoring device 43 as described permits this manner of assembly. Because the barrel 46 is split, it can be strained or spread to accommodate the dowel 34. Because there are two sets of flanges 56 and 60, which would otherwise stiffen the anchoring device, the one end can be strained or spread independent of the other during the insertion of the dowel. This, incidentally, also gives rise to one of the important advantages of the invention, namely the ability of the anchoring device to twist in opposite directions or deform in response to different kinds of forces applied at different points without resulting in cracking, fracture or breaking of the body of the facing 24.

Between the two pairs of flanges 56 and 60 there are formed oppositely extending wings 68 and 70 which are aligned and in the same plane. The wings 68, 70 are intgeral with the barrel 46 and the plane of the wings is substantially parallel with the plane defined by the flange edges 64 and 66 but spaced therefrom in a direction toward the axis of the barrel. The construction is preferably such that the plane of the wings is also parallel with the axis of the barrel. Since the flange edges 64 and 66 are practically coincidental with the plane of the front surface of the backing plate 28 and the posterior surface 30 of the facing 24, it will be obvious that the wings 68 and 70 are considerably embedded in the body of the facing. In Fig. 7, for example, the wings 68 and 70 are seen to be spaced from the exposed posterior surface 30 by a distance designated 72.

The construction and arrangement of the wings 68 and 70 and their placement within the facing 24 provides great strength to the facing. The entire facing 24 is internally reenforced by the anchoring device and prevented from splitting, cracking or crumbling. It is pointed out that the wings are formed while the anchoring device 42 is being stamped from sheet metal, and the inherent strength and resilience of the device is a characteristic of the wings as well.

The wings 68 and 70 are shown with generally rounded end contours which probably provide the best bond with the plastic material and will not likely set up strain strata in the facing. In certain situations, however, the contours of the wings may assume a great variety of shapes and contours. Although shown planar, they may have corrugations or ribs therein, which, because of the manner of formation, pose no great problem in manufacture.

Likewise the cross section of the bore 48 is substantially circular because the pin or dowel 34 which is most familiar in the art at this time conforms. The anchoring device 42 is more readily made with such geometry, but could also be varied to provide bores of polygonal or other irregular cross section without losing most of the advantages of the invention. Reference made in the claims to "keyhole-shaped" is not intended to be limited to cross sectional configurations in which the enlarged portions are circular or substantially so.

In installing the facing, any suitable procedure may be followed, including the application of usual cement to firmly hold the facing in position upon its backing plate 28, such cement being designated 74 in Fig. 7. Likewise conventional materials are used to fill crevices which are shown in blank in the illustration, but this is known to those skilled in the dental art.

It is believed that the invention has been fully explained such as to enable those skilled in the art to understand and practice the same and appreciate the salutary features thereof. It is not deemed necessary to go into further detail.

It is again desired to emphasize that variations are readily capable of being made without in any way leaving the purview of the invention. The nature of dentures and teeth is such that the angles of mounting of the facings, the sizes and shapes thereof, the manners of supporting the backing plates, and the like will vary considerably.

What it is desired to secure by Letters Patent of the United States is:

1. An artificial tooth facing adapted to be secured to a backing plate having a generally vertically arranged projection of keyhole-shaped cross section thereon, comprising a tooth-shaped body of molded material having a flat rear face, a preformed anchoring device of resilient material embedded in said body having an elongate hollow split barrel portion provided with lateral opposed integral wings parallel with and spaced from said rear face, and spaced flange means integral with the barrel portion and defining slot means opening to said rear face and communicating with the hollow of the barrel portion, the hollow having an opening at one end of the tooth-shaped body to permit insertion of the projection therein, and sliding the same into the barrel portion and said slot means, said wings being disposed between the ends of the barrel portion, and the spaced flange means being disposed on opposite sides of the wings.

2. An artificial tooth facing adapted to be secured to a backing plate having a generally vertically arranged projection of keyhole-shaped cross section thereon, comprising a tooth-shaped body of molded material having a flat rear face, a pre-formed anchoring device of resilient material embedded in said body having an elongate hollow split barrel portion provided with lateral opposed integral wings parallel with and spaced from said rear face, and spaced flange means integral with the barrel portion and defining slot means opening to said rear face and communicating with the hollow of the barrel portion, the hollow having an opening at one end of the tooth-shaped body to permit insertion of the projection therein, and sliding the same into the barrel portion and said slot means, said wings being disposed between the ends of the barrel portion, and the spaced flange means being disposed on opposite sides of the wings and having edges lying in the plane of said rear face to be engaged against said backing plate.

3. An artificial tooth facing adapted to be mounted upon a backing plate having a vertical elongate pin spaced from the face of the backing plate and connected thereto by means of a neck portion, comprising, a tooth body of molded material having a rear face to be engaged against the face of the backing plate, a pre-formed metal anchoring member embedded in the tooth body and having an elongate split barrel portion conforming in shape to slidably receive the pin, a pair of lateral large area extensions integral with the anchoring member in a plane parallel with and spaced inwardly of the said rear face, a pair of lateral flanges on each end of the barrel portion, the flanges of each pair being integral with the barrel portion and parallel with one another and spaced apart a distance slidably to accommodate said neck portion when the facing is slid upon said pin.

4. An artificial tooth facing adapted to be mounted upon a backing plate having a vertical elongate pin spaced from the face of the backing plate and connected thereto by means of a neck portion, comprising, a tooth body of molded material having a rear face to be engaged against the face of the backing plate, a pre-formed metal anchoring member embedded in the tooth body and having an elongate split barrel portion conforming in shape to slidably receive the pin, a pair of lateral large area extensions integral with the anchoring member in a plane parallel with and spaced inwardly of the said rear face, a pair of lateral flanges on each end of the barrel portion, the flanges of each pair being integral with the barrel portion and parallel with one another and spaced apart a distance slidably to accommodate said neck portion when the facing is slid upon said pin, and the flanges being perpendicular to and having their edges exposed at the said rear face.

5. The combination with a backing plate having a dowel supported in spaced disposition from the face thereof, of an artificial tooth facing having an embedded metallic anchoring device provided with a keyway to receive the dowel, and the keyway being resilient and of a diameter less than that of the dowel such that the dowel must spread the keyway in order to be slidably inserted therein and be thereafter resiliently gripped thereby, said keyway being split along the length of the device to provide two parts capable of at least some distortion one independently of the other, each part having a laterally extending wing of large area embedded in the facing inwardly spaced from opposite surfaces of the facing.

6. A metal anchoring device for use in artificial tooth facings and comprising an elongate split barrel having integral wings and pairs of parallel flanges extending laterally thereof, said flanges and wings all being symmetrical on opposite sides of the split, with the plane of the wings being perpendicular to the planes of the parallel flanges, the flanges defining slots opening to the interior of the barrel of width substantially less than the diameter of the barrel.

7. A structure as claimed in claim 6 in which the plane of the wings intersects the barrel parallel with the axis of the barrel.

8. A metal anchoring device for use in artificial tooth facings and comprising an elongate split barrel having integral wings and pairs of parallel flanges extending laterally thereof, said flanges and wings all being symmetrical on opposite sides of the split, with the plane of the wings being perpendicular to the planes of the parallel flanges, the flanges defining slots opening to the interior of the barrel of width substantially less than the diameter of the barrel, and there being a pair of such flanges at opposite ends of the barrel with a pair of such wings between the pairs of flanges.

9. A tooth facing comprising a molded body of resinous thermoplastic material having a rear face portion, a keyhole shaped slot therein with a narrow neck portion opening along the length of the face and with a wider diameter portion opening to an end to permit the slidable insertion of a keyhole-shaped member into the body, means defining said slot comprising a metal anchoring member embedded in said body and having an elongate barrel portion with a lengthwise split opening toward said rear face portion, flanges integral with the barrel portion and located on opposite edges of the split and extending from the barrel portion to said rear face portion, and wings of relatively large area integral with the barrel portion, extending from opposite edges of the split in a plane spaced from and parallel with that of said rear face.

10. A tooth facing comprising a molded body of resinous thermoplastic material having a rear face portion, a keyhole shaped slot therein with a narrow neck portion opening along the length of the face and with a wider diameter portion opening to an end to permit the slidable insertion of a keyhole-shaped member into the body, means defining said slot comprising a metal anchoring member embedded in said body and having an elongate barrel portion with a lengthwise split opening toward said rear face portion, flanges integral with the barrel portion and located on opposite edges of the split and extending from the barrel portion to said rear face portion, and wings of relatively large area integral with the barrel portion, extending from opposite edges of the split in a plane spaced from and parallel with that of said rear face, there being a pair of said flanges at opposite ends of the barrel portion with the wings between.

References Cited in the file of this patent

UNITED STATES PATENTS

| 2,475,244 | Kaufmann | July 5, 1949 |

FOREIGN PATENTS

| 161,318 | Australia | Jan. 15, 1955 |